United States Patent [19]

Wang et al.

[11] Patent Number: 4,511,710

[45] Date of Patent: Apr. 16, 1985

[54] HALIDE REMOVAL FROM FLUID ORGANIC MATERIALS

[75] Inventors: Chun S. Wang, Lake Jackson; Kyle B. Benkendorfer; John L. Burba, III, both of Angleton, all of Tex.

[73] Assignee: The Dow Chemical Company, Midland, Mich.

[21] Appl. No.: 619,440

[22] Filed: Jun. 11, 1984

[51] Int. Cl.$^3$ .................. C08G 59/14; C08F 6/28
[52] U.S. Cl. .................. 528/485; 525/10; 525/361; 525/506; 525/531; 528/44; 528/87; 549/542; 560/158; 560/218; 568/621; 585/852
[58] Field of Search .............. 525/10, 361, 506, 531; 528/44, 87, 485; 549/542; 560/158, 218; 568/621; 585/852

[56] References Cited

U.S. PATENT DOCUMENTS

| | | | |
|---|---|---|---|
| 2,952,659 | 9/1960 | Pfeifer | 524/408 X |
| 4,347,353 | 8/1982 | Miyata et al. | 528/485 |
| 4,379,882 | 4/1983 | Miyata | 528/485 X |

Primary Examiner—Earl A. Nielsen
Attorney, Agent, or Firm—W. J. Lee

[57] ABSTRACT

Unwanted halogen values are removed from liquid resin, organic or hydrocarbon material by adding particulate crystalline lithium aluminate compounds to the liquid material to act as a halogen scavenger, then separating the crystalline aluminate compound from the liquid material.

13 Claims, No Drawings

HALIDE REMOVAL FROM FLUID ORGANIC MATERIALS

BACKGROUND OF THE INVENTION

Crystalline compositions conforming generally to the empirical formula Li$^+$ (RCOO$^-$)·2Al(OH)$_3$·$n$H$_2$O, where RCOO$^-$ represents an organic acid anion, are disclosed, inter alia, in U.S. Pat. No. 4,348,295, U.S. Pat. No. 4,348,296, and U.S. Pat. No. 4,348,297. These 3 patents are incorporated herein by reference. Other relevant background patents are U.S. Pat. No. 4,116,856; U.S. Pat. No. 4,116,858, U.S. Pat. No. 4,159,311; U.S. Pat. No. 4,221,767; U.S. Pat. No. 4,347,327; U.S. Pat. No. 4,321,065; U.S. Pat. No. 4,376,100; and U.S. Pat. No. 4,381,349, all of which disclose related lithium aluminates.

Also disclosed are Crystalline LiX·2Al(OH)$_3$·$n$H$_2$O compounds and derivatives thereof, e.g., where the X anion represents OH, halide, halo acid, inorganic acid, organic acid and others. The compounds are referred to generally as "lithium aluminates" and are prepared, principally, by reacting lithium compounds with hydrous alumina and forming crystalline LiX·2Al(OH)$_3$·$n$H$_2$O which in some cases are of the "two-layer" variety and in some cases of the "three-layer" variety, depending on the particular method or materials employed. Methods for preparing these known crystalline lithium aluminates, of the LiX·2Al(OH)$_3$·$n$H$_2$O and LiOH·2Al(OH)$_3$·$n$H$_2$O formulae, both 2-layer and 3-layer varieties, and anion exchanges or replacements in the crystals, are disclosed in the patents identified above, especially those incorporated by reference.

There are various polymers and resins which are used as coatings for substrates that are subject to deleterious attack by halogens or inorganic acid ions contained in the polymers and resins. These polymers and resins may be of the thermoplastic variety or of the thermosetting variety. The halogen or inorganic acid groups may be present (though usually unwelcome) as catalyst residues, polymerization aids, processing aids, impurities, or contaminants, or may be residual reaction products which are difficult to remove. For example, when olefin polymers are prepared using a halogen-containing metal catalyst (such as the well-known Ziegler catalyst or Natta catalyst or variations of these) the polymers ordinarily contain a catalyst residue which contains halogen groups. As another example, epoxy resins, prepared by reacting bisphenol A with epichlorohydrin to produce bis-oxirane molecules, contain a chlorine-containing reaction residue which is difficult to remove. There are other liquid (or liquifiable) organic or hydrocarbons which, if they contain extraneous halides, are beneficially treated with the halide scavengers of the present invention.

There are a number of commercially available compounds that are used, as additives, to control HCl levels in polymers. These stabilizers are designed to either neutralize HCl or to neutralize the HCl and reduce the Cl$^-$ solubility. Since soluble halides would be detrimental in many of the applications in which we are interested, only compounds which can reduce the halide concentration, not add to it, are of interest here. A large number of lead salts are used in PVC wire and cable coatings. Such compounds include basic lead carbonate, monobasic and tribasic lead sulfates, dibasic lead phthalate, basic lead sulfate/phthalate, lead sulfate/silicate complexes, dibasic lead phosphite and normal and dibasic stearates. These compounds would probably not be useful for applications such as controlling corrosion of semiconductors because PbCl$_2$ is too soluble. The electronics industry has very stringent requirements concerning soluble metal salt levels. They may be useful in other types of epoxy coatings.

Another disadvantage to lead compounds is their extreme toxicity. The present lithium aluminate compounds used in the present invention have not been found to exhibit acute toxicity problems.

For purposes of conciseness, we shall use the terms liquid "resin" and "resinous material" in a general sense in this disclosure to mean polymers, plastics, resins, prepolymers, resin precursors, cured resins, uncured resins, and the like, which are in a liquid state, including melts or solutions thereof. The terms "organic" and "hydrocarbon" are used herein for non-aqueous materials which may not usually be called resins or polymers, but which contain halide values removable by the present inventive method.

SUMMARY OF THE INVENTION

A resin, resinous material, organic, or hydrocarbon which is in a liquid or dissolved state, and which contains halide values which are desirably removed, is mixed with a halide scavenger comprising a particulate crystalline lithium aluminate which conforms, generally, to the empirical formula

$$(LiX_x)_y \cdot 2Al(OH)_3 \cdot nH_2O$$

where preferably X is OH$^-$ ion and/or RO$^-$ and/or RCOO$^-$ ion, where R represents an organic moiety, x is an amount of X sufficient to substantially satisfy the valence requirements of Li in the crystal structure, y is a positive amount of Li at least sufficient to maintain the crystal structure, usually in the range of about 0.05 to about 2, (preferably about one), and n represents a numerical amount of zero or more for waters of hydration, and the halide scavenger is then removed (such as by filtration) from the liquid resin, organic or hydrocarbon material, thereby substantially removing halide values therefrom. In some cases at least part of the X ions may be RSO$_3^-$, RPO$_3^-$, a silicic acid anion, or an organosilicic acid anion, and the like, where the present scavenger takes up halide ions from the liquid, even though other ions are released into the liquid from the scavenger. Preferably R represents an organic moiety having from 1 to about 24 carbon atoms.

DETAILED DESCRIPTION

One of the major problems that is encountered in resin coatings is corrosion of the coated metal. In some cases, it has been well established that corrosion occurs when H$_2$O migrates to the metal surface carrying dissolved halides with it. Once this occurs, corrosion begins due to interaction of the halide ions with the metal. It is also known that corrosion is a multiplicitive function of the mass of water that is absorbed by the coating, the halide concentration and the temperature. Thus, if any of the three variables is held at or close to zero, the corrosion rate will be reduced accordingly.

An example of a resin system in which halides are a problem is that of epoxy resin. In epoxy, chlorine is known to exist in three forms. They are (1) chloride ions which are generated during the production of epoxy, (2) chlorine associated with chlorohydrin functionalities in the epoxy, and (3) "bound chlorine" which is chlorine that is bonded to the polymer chain but is not alpha to a hydroxyl group.

Under the conditions in which water can migrate into the polymer (1) $Cl^-$ ions can travel to the metal surface by dissolution, (2) chlorohydrin can hydrolyze producing HCl which can migrate to the metal surface, and (3) "bound chlorine" can undergo slow hydrolysis generating HCl which can migrate to the metal surface.

An example where this corrosion problem is very important is in the area of electronics. Microelectronic chips are routinely coated with epoxy resins to isolate them from the environment. The trend in the industry is to move toward epoxy that contains very low, or nil, concentrations of halides.

The present invention provides a means whereby resin (in liquid state), such as an epoxy resin, containing significant quantities of halide is contacted with a layered mixed metal hydroxide such as lithium aluminate. The layered mixed metal hydroxide is then separated from the epoxy, taking undesirable halide ions with it.

We have found, e.g., that lithium hydroxy-aluminate, $LiOH \cdot 2Al(OH)_3 \cdot nH_2O$, and lithium stearate aluminate, $LiO_2C(CH_2)_{16}CH_3 \cdot 2Al(OH)_3 \cdot nH_2O$, where n is a positive number or zero, have the ability to scavenge chlorine from all three chlorine sources in epoxy. (1) They have the ability to sorb $Na^+$ and $Cl^-$ ions from liquid epoxy systems. (2) They can dehydrochlorinate chlorohydrin functionalities in epoxy. (3) They can decrease the concentration of "bound chlorine" in epoxy. (4) They can also absorb HCl from organic systems. In each case, the $Cl^-$ ion is held by the insoluble lithium aluminate crystal.

Generally $(LiRCOO^-)_y \cdot 2Al(OH)_3 \cdot nH_2O$ is preferred when scavenging molten epoxy materials, but $(LiOH)_y \cdot 2Al(OH)_3 \cdot nH_2O$ is preferred when scavenging epoxy material diluted with a solvent.

Various means are used in intimately dispersing the acid scavengers into the resin or resinous material. One method comprises intimately mixing the scavengers with a solution of the resin, especially a solution in an organic solvent which is substantially inert to the scavengers. Another method is to intimately mix the scavengers with the molten resin, or the resin precursor (or prepolymer) in a liquid state. Resins which do not have a low viscosity at ambient temperature may need to be "thinned" by use of a solvent and/or by elevating the temperature.

Among the thermoplastic resin materials within the purview of the present invention are, e.g., polyolefins, olefin copolymers, polycarbonate, polyacrylics, styrene polymers and copolymers, polyvinyls, polydiolefins, polyacrylates, polyhaloolefins, polyalkyleneimines, and the like. Except for the low molecular weight versions of these thermoplastics, which generally can be liquified fairly well at a temperature below about 150° C., it may be found to be beneficial to employ solvents to dissolve the polymers rather than risk untoward effects (e.g. degradation, crosslinking, scorching, etc.) at higher temperatures.

Among the liquid thermosetting (or otherwise curable) resin materials within the purview of the present invention are, e.g., epoxies, epoxy-novolacs, vinyl-ester, polyester, polyurethane, polyethers, and the like. The resins which are thickened, gelled, or crosslinked by application of elevated temperature, but which require thinning for use in the present invention, should be thinned with a solvent in order to obtain intimate, thorough contact with the acid scavenger.

The present acid scavenger may be intimately and thoroughly contacted with the halide-containing organic liquid, hydrocarbon liquid, or liquid resin (or liquified resin) by being mixed with the halide-containing liquid and then filtered out or caused to settle out, such as by standing or centrifuging, and the liquid decanted. Another method which may be beneficially employed is the use of a bed or column of the acid scavenger, through which the halide-containing liquid (or liquidifed) material is flowed.

The amount of acid scavenger needed to reduce the halide values to the desired or acceptable level will depend, to a large extent, on the amount of halide values in the halide-containing material and on the amount of residual halide values deemed to be acceptable after treatment with the acid scavenger.

From the stoichiometric viewpoint, a 2-layer crystal of, e.g., $(LiOH)_y \cdot 2Al(OH)_3 \cdot nH_2O$ should take up y number of $Cl^-$ ions, assuming 100% efficiency of scavenging. However, since 100% efficiency of scavenging is probably not obtained using only stoichiometric amounts, then a stoichiometric excess of the acid scavenger is recommended.

The crystalline lithium aluminates of the present invention trap $Cl^-$ ions in the crystalline matrix. When the lithium aluminate crystal is removed from the liquid (or liquified) material, the trapped $Cl^-$ ions are removed with it; in the process any $H_2O$, $OH^-$, or $RCOO^-$ ions from the crystals that are left in the material are considered to be inconsequential and are much less deleterious than the $Cl^-$ which was removed.

The following examples are to illustrate particular embodiments, but the invention is not limited to the particular embodiments illustrated.

EXAMPLE 1

Crystalline lithium stearate aluminate of the formula $LiO_2C(CH_2)_{16}CH_3 \cdot 2Al(OH)_3 \cdot nH_2O$ (where n is believed to be $<1$) is mixed with a liquid uncured epoxy novolac resin in an amount of 1 part of crystals to 100 parts of resin at 150° C. The mixture is stirred for 30 minutes and filtered through a WATMAN-42-ASHLESS filter paper to remove the aluminate crystals. Standard analyses of the resin before treatment (blank) and after the above treatment (treated) are shown below in Table I.

TABLE I

| Sample | Hydrolyzable Cl | Ionic Cl | Total Cl |
|---|---|---|---|
| Blank | 71 ppm | 4.7 ppm | 0.201% |
| Treated | 14 ppm | 1 ppm | 0.185% |

The chloride content is further reducible by one or more repetitions of the above described technique.

EXAMPLE 2

Samples of liquid epoxy resin, containing hydrolyzable $Cl^-$ content in the range of about 90 to about 100 ppm, are mixed with 5% by wt. of lithium stearate aluminate (a.k.a. lithium aluminum hydroxy stearate) as a $Cl^-$ scavenger. The mixtures are heated and stirred for measured lengths of time at different temperatures before being filtered to remove the scavenger, and the epoxy is analyzed for residual $Cl^-$. Data are shown in Table II.

TABLE II

| Treatment Time (min.) | Hydrolyzable Cl⁻ (ppm) After Treatment | | |
| --- | --- | --- | --- |
| | 150° C. | 160° C. | 180° C. |
| 0* | 92 | 90 | 96 |
| 30 | 70 | 60 | 48 |
| 60 | 50 | 40 | 27 |
| 90 | 36 | 33 | 22 |
| 120 | 31 | 31 | 20** |

*starting material
**by extrapolation

We claim:

1. A method for reducing the halogen content of a liquid resin, organic or hydrocarbon material which contains unwanted halogen values, said method comprising
    intimately contacting said material with a halogen scavenger,
    then separating said scavenger from said material, wherein
    said scavenger comprises a particulate crystalline lithium aluminate compound which conforms, generally, to the empirical formula $(LiX_x)_y \cdot 2Al(OH)_3 \cdot nH_2O$ where X is at lease one anion or negative-valence radical other than halide, x is an amount of X sufficient to substantially satisfy the valence requirements of Li in the crystal structure, y is a positive amount of Li at least sufficient to maintain the crystal structure, and n represents a numerical amount of zero or more for waters of hydration.
2. The method of claim 1 wherein X is OH⁻.
3. The method of claim 1 wherein X is RCOO⁻, with R representing an organic moiety having from 1 to about 24 carbon atoms.
4. The method of claim 1 wherein X is at least one negative-valence radical of the group comprising $RSO_3^-$, $RPO_3^-$, silicic acid anion, and organo-silicic acid anion, where R represents an organic moiety having from 1 to about 24 carbon atoms.
5. The method of claim 1 wherein X is the negative-valence radical of a fatty acid.
6. The method of claim 1 wherein X is the negative-valence radical of stearic acid.
7. The method of claim 1 wherein X represents, in the same crystal, both OH⁻ anions and RCOO⁻ radicals, where R is an organic moiety.
8. The method of claim 1 wherein the liquid material is an epoxy resin, an epoxy-novolac resin, or a precursor for an epoxy resin.
9. The method of claim 1 wherein the liquid material is an epoxy resin material at an elevated temperature, and wherein the X represents the RCOO⁻ radical of a fatty acid.
10. The method of claim 1 wherein the liquid material is an epoxy resin material which has been thinned by a solvent and wherein the X represents the OH⁻ ion.
11. The method of claim 1 wherein the liquid material is a molten or dissolved thermosetting resin or polymer, or precursor thereof.
12. The method of claim 1 wherein the liquid material is a molten or dissolved thermoplastic resin or polymer, or precursor thereof.
13. The method of claim 1 wherein the liquid material is a non-aqueous organic or hydrocarbon having scavengeable halide values.

* * * * *

UNITED STATES PATENT OFFICE
CERTIFICATE OF CORRECTION

PATENT NO. : 4,511,710
DATED : April 16, 1985
INVENTOR(S) : Chun S. Wang, Kyle B. Benkendorfer and John L. Burba, III It is certified that error appears in the above-identified patent and that said Letters Patent are hereby corrected as shown below:

Col. 2, line 33; after "RO-" insert --ion--.

Signed and Sealed this

Fourteenth Day of April, 1987

*Attest:*

DONALD J. QUIGG

*Attesting Officer*     *Commissioner of Patents and Trademarks*